United States Patent [19]

Patel

[11] Patent Number: 4,958,656

[45] Date of Patent: Sep. 25, 1990

[54] PRESSURE RELIEF VALVE

[75] Inventor: Ajitkumar G. Patel, Oxford, Ohio

[73] Assignee: Dresser Industries, Inc., Dallas, Tex.

[21] Appl. No.: 374,081

[22] Filed: Jun. 29, 1989

[51] Int. Cl.$^5$ .................... F16K 17/12; F16K 31/124
[52] U.S. Cl. .................... 137/467; 137/492; 137/508
[58] Field of Search ............ 137/508, 467, 488, 489, 137/490, 492

[56] References Cited

U.S. PATENT DOCUMENTS

| | | | |
|---|---|---|---|
| 359,949 | 3/1887 | Wilson | 137/489.5 |
| 382,643 | 5/1888 | Fox | 137/490 X |
| 1,117,399 | 11/1914 | Kibele | |
| 2,081,462 | 5/1937 | McClure | 277/42 |
| 2,376,971 | 5/1945 | Kleit | 128/207 |
| 2,408,708 | 10/1946 | Tweedle | 137/489.5 |
| 2,520,893 | 8/1950 | Stevenson | 137/490 |
| 2,532,639 | 12/1950 | Payne | 126/380 |
| 2,805,681 | 9/1957 | English et al. | 137/508 |
| 2,984,254 | 5/1961 | Allen | 137/467 |
| 3,055,391 | 9/1962 | Shuk et al. | 137/516.25 |
| 3,459,218 | 8/1969 | Cranage | 137/557 |
| 3,603,343 | 9/1971 | Keller | 137/493.6 |
| 4,681,138 | 7/1987 | Giuliani | 137/516.29 |

Primary Examiner—Stephen M. Hepperle

[57] ABSTRACT

A pressure relief valve has a hollow valve body with one or more vent ports in the side wall and a small pilot opening in a first end. A lightweight sleeve, closed at one end, telescopes over the first end of the valve body to close the vent ports. A pressure actuatable element is positioned on the outer surface of the valve body end so as to block the pilot opening therein until the pressure in the valve body exceeds a predetermined value. When the pressure actuatable element unblocks the pilot opening, the interior of the closed end of the sleeve is exposed to the pressure in the valve body, causing the lightweight sleeve to move relative to the valve body to open the vent ports. Suitable pressure actuated elements include a rolling ball or a spring biased closure plate.

21 Claims, 1 Drawing Sheet

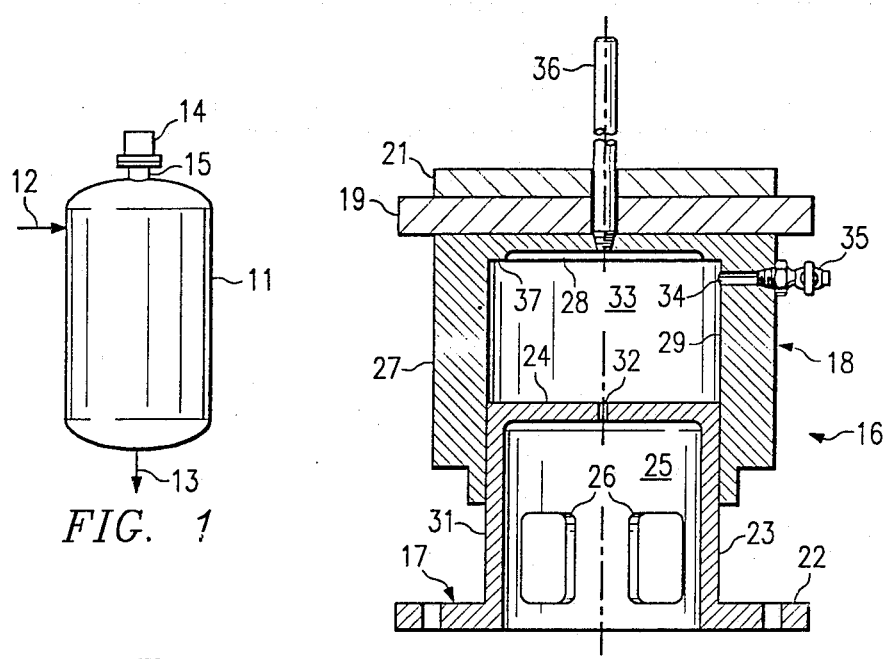
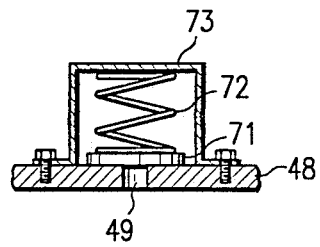

4,958,656

PRESSURE RELIEF VALVE

FIELD OF THE INVENTION

This invention relates to pressure relief valves. In one aspect, the invention relates to a light-weight pressure relief valve. In another aspect, the invention relates to a light-weight relief valve actuated by a high pressure pilot valve.

BACKGROUND OF THE INVENTION

Pressure relief valves, utilizing a variable number of control weights to determine the relief pressure at which the valve is actuated, are employed commercially. However, for large size valves such design has a severe disadvantage, the amount of weight required. For example, a weighted relief valve with a 12" diameter would require a total of 1131 pounds of weight (movable cap plus control weights) for a relief pressure of only 10 psig. Such high total weights make these valves very expensive to manufacture, to support in their installation, and to maintain.

SUMMARY OF THE INVENTION

Accordingly, it is an object of the present invention to provide an improved pressure relief valve. Another object of the invention is to provide a light-weight pressure relief valve which is inexpensive to manufacture and install. A further object of the invention is to provide an improved pressure relief valve which can be readily maintained.

The present invention provides a light-weight pressure relief valve which avoids the foregoing difficulties of the weighted pressure relief valve. A relief valve in accordance with the present invention comprises a hollow valve body having one or more large vent ports in its side wall and a small pilot orifice in a first end wall. Fluid communication is provided between the interior of the valve body and the pressurized container to be protected against excessive pressure. A light-weight sleeve, closed at one end, telescopes over the first end of the valve body to close the vent ports under normal pressure conditions in the pressurized container. A pressure actuatable element is positioned on the outlet of the pilot orifice to permit fluid communication between the valve body interior and the interior chamber formed in the sleeve between the closed end of the sleeve and the first end of the valve body. The ratio of (a) the inside surface of the sleeve which is effectively perpendicular to the direction of movement of the sleeve and is exposed to fluid pressure in the interior chamber to (b) the area of the pilot orifice, and the ratio of (c) the weight of the sleeve to (d) the effective weight of the resistance of the pressure actuatable element are such that the pressure in the pressurized container necessary to move the pressure actuatable element to unblock the pilot orifice is substantially more than the pressure in the interior chamber necessary to move the sleeve to open the vent ports.

BRIEF DESCRIPTION OF THE DRAWINGS

In the drawings, FIG. 1 is a diagrammatic representation of a pressurized fluid vessel provided with a pressure relief valve;

FIG. 2 is a vertical cross-sectional view of a prior commercial pressure relief valve;

FIG. 3 is a vertical cross-sectional view of a pressure relief valve in accordance with a first embodiment of the invention;

FIG. 4 is a cross-sectional view taken along line 4—4 in FIG. 3; and

FIG. 5 is a fragmentary vertical cross-sectional view of a pressure relief valve in accordance with a second embodiment of the invention.

DETAILED DESCRIPTION

In FIG. 1, a pressurized fluid container 11 is provided with an inlet conduit 12 and an outlet conduit 13. In order to protect container 11 against excessive internal pressures, a pressure relief valve 14 is mounted on the flange of an access conduit 15.

A prior art commercial weighted pressure relief valve 16 is represented by the illustration in FIG. 2. The valve 16 comprises a valve body 17, cap 18 and control weights 19 and 21. Valve body 17 comprises an annular flange 22 surrounding and connected to the base of an annular side wall 23. The opposite end of the annular side wall 23 is joined to end wall 24. The inner surfaces of annular side wall 23 and end wall 24 form a chamber 25. Fluid communication can be provided from the interior of container 11 through access conduit 15 to chamber 25 so that the fluid pressure in chamber 25 is the same as in container 11. A plurality of vent ports 26 are provided in the annular side wall 23 so that when the cap 18 is the raised position shown in FIG. 2, the fluid from container 11 can be vented through ports 26.

Cap 18 comprises an annular wall 27 and an end wall 28. The interior surface 29 of wall 27 mates with the exterior surface 31 of the valve body sidewall 23 so that cap 18 can telescope over end 24 of valve body 17. A passageway 32 in end wall 24 provides for fluid communication between chamber 25 and chamber 33 formed by the interior of cap 18 between valve body end wall 24 and cap end wall 28. A bleed opening 34 in the sidewall 27 of cap 18 is provided with a bleed valve 35 to permit release of fluid from chamber 33 at a very slow rate. A solid rod 36 is secured to end wall 28 of the cap 18 to provide a secure retention of weights 19 and 21 which have central openings therethrough to accommodate rod 36.

When the pressure in container 11 is below the predetermined value at which the relief valve is to be actuated, cap 18 rests with the lower edge of sidewall 27 sitting on flange 17, thereby closing vent ports 26. The shoulder 37 is spaced from end wall 24 in this closed position. The pressure in each of chambers 25 and 33 is essentially the same as the pressure in container 11. To the extent that bleed valve 35 is partially or fully open, there will be a constant bleeding of fluid through chambers 25 and 33 and valve 35.

The pressure at which relief valve 16 is actuated is determined by (a) the area of end wall 28, including shoulder 37, which is effectively perpendicular to the line of movement of the cap 18 and (b) the total weight of cap 18 and weights 19 and 21. Weights 19 and 21 can be of different size and more than two weights can be positioned on the cap 18 to achieve the desired total weight. Where the external diameter of end wall 24 is 12" and the actuation pressure in chamber 33 is to be 10 psig, the weight of cap 18 and weights 19 and 21 must be 1131 pounds. Fine tuning of the activation pressure can be achieved by the position of bleed valve 35.

Referring now to FIG. 3 and 4, the inventive pressure relief valve 41 comprises a valve body 42 and a cap sleeve 43. The valve body 42 comprises an annular flange 44, containing bolt holes 45, an annular sidewall 46 containing vent ports 47, and an end wall 48 containing a pilot passageway 49. Flange 44 is connected to the lower end of sidewall 46 while end wall 48 is connected to the upper end of sidewall 46. The inner surfaces of annular sidewall 46 and end wall 48 form a pressurizable chamber 51 in valve body 42 which can be in fluid communication with the interior of container 11 through access conduit 15 so that the pressure in chamber 51 is essentially the same as in container 11.

Cap sleeve 43 comprises an annular sidewall 52 and an end wall 53. The inner surface 54 of cap sleeve sidewall 52 mates with the outer surface 55 of valve body sidewall 46 so that cap sleeve 43 telescopes over the end wall 48 and side wall 46 of the valve body 42. The length of cap sleeve side wall 52 is substantially longer than the length of valve body sidewall 46 so that in the closed position shown in FIG. 3, the lower end of cap sleeve sidewall 52 rests on flange 44, leaving a pressurizable chamber 56 within cap sleeve 43 between end wall 53 and valve body end wall 48. A bleed valve 57 can be positioned in bleed opening 58 in the portion of side wall 52 which forms chamber 56. If desired, an annular seal 59 can be provided between the mating portions of the sidewalls 46 and 52 to provide greater protection against fluid communication between chambers 51 and 56 via any annular space between the outer surface 55 of sidewall 46 and the inner surface 54 of sidewall 52.

A pressure actuatable element is positioned on the outlet end of pilot passageway 49 to block passageway 49 whenever the pressure in chamber 51 is less than the predetermined value at which the pressure relief valve is to be actuated, and to unblock the passageway 49 whenever the fluid pressure in chamber 51 is above that predetermined value. The transverse cross-sectional area of passageway 49 is very small compared to the area of the interior surface of end wall 48 which forms part of chamber 51. In the embodiment of FIG. 3, passageway 49 has a circular outlet opening and the pressure actuatable element is a spherical body 61 which has a diameter greater than the diameter of the outlet of passageway 49, but less than the distance between end walls 48 and 53 when sleeve 43 is in the closed position. Thus, when the upward force represented by the fluid pressure in chamber 51 acting upwardly on the transverse surface of sphere 61 represented by the transverse cross sectional area of the outlet opening of passageway 49 exceeds the sum of the weight of sphere 61 and the force represented by the fluid pressure in chamber 56 acting downwardly on the transverse surface area of sphere 61 represented by the transverse cross-sectional area of the outlet opening of passageway 49, the sphere 61 is moved aside, permitting passage of fluid from chamber 51 into chamber 56. When the upward force is less than the downward force, sphere 61 is sealing secured in the outlet opening of passageway 49, blocking fluid communication between chambers 51 and 56. The outer surface of end wall 48 can be curved so that it diverges upwardly and outwardly from the outlet end of passageway 49. This facilitates the return of sphere 61 to its closed position, blocking passageway 49.

When the pressure in container 11 has been below the predetermined actuation pressure long enough, the fluid in chamber 56 has been reduced to atmospheric pressure (or other desired reference pressure) by excess fluid having been bled off through bleed valve 57. With atmospheric pressure in chamber 56, the force required to move the weight of sphere 61 off passageway 49 is a function of the diameter of passageway 49 and the gage pressure in chamber 51. Where side wall 46 of valve body 42 has an external diameter of 12" and passageway 49 has a diameter of 0.5", the weight of ball 61 required to close passageway 49 up to 10 psig in chamber 51 is only 1.96 pounds, compared to the 1131 pounds for the valve of FIG. 2. The side wall 52 of cap sleeve 43 has to have sufficient strength to resist the radially outwardly directed pressures through vent ports 47 when cap sleeve 43 is in the closed position, but cap sleeve 43 does not have to provide the weight to resist all pressures below the predetermined value applied against the transverse cross-sectional area of the inner surface of end wall 53. A cap sleeve 43 with an internal diameter of 12" and formed of ¼" thick cast iron might weigh approximately 50 pounds in contrast to the 1131 pounds for the weighted cap of FIG. 2.

Referring now to FIG. 5, an alternate embodiment of the pressure actuable element for blocking or unblocking passageway 49 in end wall 48 comprises a plate 71, spring 72 and bracket 73. The dimensions of plate 71 are larger than the corresponding dimensions of the outlet of passageway 49 so as to completely block the outlet when biased against end wall 48 by spring 72. Bracket 73 surmounts the outlet opening of passageway 49 and plate 71, with the ends of bracket 73 being secured by suitable means to the outer surface of wall 48. Where sufficient height in chamber 56 is available, other spring and support configurations can be employed. Plate 71 can be a disc where the outlet opening of passageway 49 is circular.

While the side wall 46 of valve body 42 and the side wall 52 of valve sleeve 43 have been illustrated as having mating cylindrical surfaces, other configurations can be employed so long as sleeve 43 is telescopically slidable over valve body 42 along a direction parallel to the longitudinal axis 62 of the effective portion of valve body 42. In general, it is preferable that each of the outer surface 55 of valve body side wall 46 and the corresponding inner surface 54 of sleeve side wall 52 be representable as a surface at least generally defined as the revolution of a line about the longitudinal axis 62, with the line preferably being parallel to the axis 62. While surface 55 extends completely about the periphery of valve body 42, it is recognized that it can be interrupted, for example, by one or more longitudinal keyways to receive keys to prevent rotation of sleeve 43, as well as circumferential grooves for seals such as 59. Similarly, inner surface 54 of sleeve 43 extends completely about the inner periphery of sleeve 43, but can be interrupted for keyways and seal grooves.

The mating surface 55 does not have to extend completely from one to the other of the spaced apart ends of valve body 42; and the mating surface 54 does not have to extend the full length of sleeve 43; so long as the surfaces 54 and 55 mate at and between the open and closed positions of the pressure relief valve. Thus, a seat for the lower end of sleeve side wall 52 could be provided on valve body 42 at a position above flange 44. Similarly, the upper end of sleeve 43 could have one or more stages of reduced interior diameter, as provided by shoulder 37 in FIG. 2, or even a hemispherical configuration. In such multi-surface configurations, it is recognized that the effective pressure surface is represented by the cross-sectional area of the valve body end wall 48 measured in a plane perpendicular to the longitudinal axis 62.

In the embodiment employing a rotatable pressure actuatable member, the outer surface of end wall 48 can be contoured as a frustoconical surface, a parabolic surface or any other curved surface suitable for aiding the return of the rotatable element to its blocking position over passageway 49. Instead of a spherical configuration, such rotatable element can have a cylindrical shape, a barrel shape or any other curved shape which permits it to rotate and yet block a suitable correspondingly shaped outlet of passageway 49. The pressure actuatable member can be placed in a cage which would minimize, if not eliminate, its sidewise movement but permit it to clear the passageway 49 sufficiently for the fluid pressure in chamber 51 to cause sleeve 43 to be moved from its closed position, blocking vent ports 47, to its open position, at least substantially clearing vent ports 47.

Other reasonable variations and modifications of the invention are possible within the scope of the foregoing disclosure and the appended claims to the invention.

I claim:

1. A relief valve adapted to be joined to a pressurized fluid container to protect the fluid container against internal fluid pressure above a predetermined value, the relief valve comprising:

a valve body having first and second ends spaced apart from each other along the longitudinal axis of the valve body, the valve body having a first chamber formed therein, the valve body having an outer wall surface extending around the periphery of the valve body between the first and second ends of the valve body, the outer wall surface of the valve body having at least one fluid pressure relief opening therein which is in fluid communication with said first chamber, the first end of said val;ve body having an opening therein in fluid communication with said first chamber and adapted to provide fluid passage into said first chamber from said pressurized fluid container, the second end of the valve body having an opening therein in fluid communication with said first chamber, the area of the opening in the second end of the valve body being substantially smaller than the area of the second end of the valve body;

a valve sleeve member closed at one end by a cap wall and open at the opposite end, the valve sleeve member having an inner wall surface which corresponds to said outer wall surface of the valve body so as to permit the valve sleeve member to encompass the outer wall surface of the valve body with the inner wall surface of the valve sleeve member being in slidable engagement with the outer wall surface of the valve body between a closed position and an open position with the relative motion therebetween being at least generally parallel to the longitudinal axis of the valve body so that in closed position said at least one fluid pressure relief opening is at least substantially sealed by the valve sleeve member and in said open position said at least one fluid pressure relief opening is not blocked by the valve sleeve member, a second chamber located within said valve sleeve member and being at least generally defined by the second end of the valve body, said cap wall and said inner wall surface of the valve sleeve member;

a pressure actuatable element positioned to block said opening in the second end of the valve body when the fluid pressure in said first chamber in the valve body is below said predetermined value and to unblock said opening in the second end of the valve body when the fluid pressure in said first chamber in the valve body is above said predetermined value, thereby permitting fluid to pass from the pressurized fluid container through said first chamber and the opening in the second end of the valve body into said second chamber when the fluid pressure in the pressurized fluid container exceeds said predetermined value, with the resulting increase in pressure against the cap wall of the valve sleeve member causing the movement of the valve sleeve member from said closed position to said open position to thereby vent fluid from the pressurized fluid container through said first chamber and said at least one fluid pressure relief opening in the outer wall surface of the valve body, wherein said pressure actuatable element is a rotatable body having dimensions greater than the corresponding dimensions of said opening in the second end of the valve body.

2. A relief valve in accordance with claim 1 wherein said opening in the second end of the valve body is a circular opening and wherein said rotatable body is a spherical body having a diameter greater than the diameter of said circular opening.

3. A relief valve in accordance with claim 2 wherein said second end of the valve body has a generally curved surface which diverges upwardly and outwardly from said circular opening.

4. A relief valve in accordance with claim 3 wherein each of said outer wall surface of the valve body and said inner wall surface of the valve sleeve member is at least generally defined by the revolution of a line about the longitudinal axis of the valve body.

5. A relief valve in accordance with claim 3 wherein each of said outer wall surface of the valve body and said inner wall surface of the valve sleeve member has at least generally the configuration of a surface defined by the revolution about the longitudinal axis of the valve body of a line parallel to said longitudinal axis.

6. A relief valve in accordance with claim 5 further comprising a bleed opening in said valve sleeve member in fluid communication with said second chamber to permit fluid pressure in said second chamber to decrease by fluid bleeding through the bleed opening after the pressure in the pressurized fluid container has dropped to a value which permits the spherical body to again block said circular opening.

7. A relief valve in accordance with claim 6 further comprising a bleed valve operatively connected to said bleed opening.

8. A relief valve in accordance with claim 7 wherein the ratio of (a) the area of the inside surface of the valve sleeve member which is effectively perpendicular to the longitudinal axis of the valve body and is exposed to fluid pressure in said second chamber to (b) the area of said circular opening, and the ratio of the weight of said valve sleeve member to the weight of said spherical body are such that the pressure in said first chamber required to move said spherical body to unblock said circular opening is substantially less than the fluid pressure in said second chamber required to move said valve sleeve member from said closed position to said open position.

9. A relief valve in accordance with claim 8 further comprising annular sealing means positioned in one of said valve body and said valve sleeve element to prevent fluid communication between said first chamber and said second chamber via the annular space between said outer wall surface of the valve body and said inner wall surface of the valve sleeve member.

10. A relief valve adapted to be joined to a pressurized fluid container to protect the fluid container against internal fluid pressure above a predetermined value, the relief valve comprising:

a valve body having first and second ends spaced apart from each other along the longitudinal axis of the valve body, the valve body having a first chamber formed therein, the valve body having an outer wall surface extending around the periphery of the valve body between the first and second ends of the valve body, the outer wall surface of the valve body having at least one fluid pressure relief opening therein which is in fluid communication with said first chamber, the first end of said valve body having an opening therein in fluid communication with said first chamber and adapted to provide fluid passage into said first chamber from said pressurized fluid container, the second end of the valve body having an opening therein in fluid communication with said first chamber, the area of the opening in the second end of the valve body being substantially smaller than the area of the second end of the valve body;

a valve sleeve member closed at one end by a cap wall and open at the opposite end, the valve sleeve member having an inner wall surface which corresponds to said outer wall surface of the valve body so as to permit the valve sleeve member to encompass the outer wall surface of the valve body with the inner wall surface of the valve sleeve member being in slidable engagement with the outer wall surface of the valve body between a closed position and an open position with the relative motion therebetween being at least generally parallel to the longitudinal axis of the valve body so that in said closed position said at least one fluid pressure relief opening is at least substantially sealed by the valve sleeve member and in said open position said at least one fluid pressure relief opening is not blocked by the valve sleeve member, a second chamber located within said valve sleeve member and being at least generally defined by the second end of the valve body, said cap wall and said inner wall surface of the valve sleeve member;

a pressure actuatable element positioned to block said opening in the second end of the valve body when the fluid pressure in said first chamber in the valve body is below said predetermined value and to unblock said opening in the second end of the valve body when the fluid pressure in said first chamber in the valve body is above said predetermined value, thereby permitting fluid to pass from the pressurized fluid container through said first chamber and the opening in the second end of the valve body into said second chamber when the fluid pressure in the pressurized fluid container exceeds said predetermined value, with the resulting increase in pressure against the cap wall of the valve sleeve member causing the movement of the valve sleeve member from said closed position to said open position to thereby vent fluid from the pressurized fluid container through said first chamber and said at least one fluid pressure relief opening in the outer wall surface of the valve body;

wherein said pressure actuatable element comprises a closure member of a size sufficient to block said opening in the second end of the valve body, and a spring biasing said closure member into engagement with the second end of the valve body to block said opening in the second end of the valve body;

wherein each of said outer wall surface of the valve body and said inner wall surface of the valve sleeve member has at least generally the configuration of a surface defined by the revolution about the longitudinal axis of the valve body of a line parallel to said longitudinal axis;

a bleed opening in said valve member in fluid communication with said second chamber to permit fluid pressure in said second chamber to decrease by fluid bleeding through the bleed opening after the pressure in the pressurized fluid container has dropped to a value which permits the closure member to again block said opening in the second end of the valve body; and a bleed valve operatively connected to said bleed opening.

11. A relief valve adapted to be joined to a pressurized fluid container to protect the fluid container against internal fluid pressure above a predetermined value, the relief valve comprising:

a valve body having first and second ends spaced apart from each other along the longitudinal axis of the valve body, the valve body having a first chamber formed therein, the valve body having an outer wall surface extending around the periphery of the valve body between the first and second ends of the valve body, the outer wall surface of the valve body having at least one fluid pressure relief opening therein which is in fluid communication with said first chamber, the first end of said valve body having an opening therein in fluid communication with said first chamber and adapted to provide fluid passage into said first chamber from said pressurized fluid container, the second end of the valve body having an opening therein in fluid communication with said first chamber, the area of the opening in the second end of the valve body being substantially smaller than the area of the second end of the valve body;

a valve sleeve member closed at one end by a cap wall and open at the opposite end, the valve sleeve member having an inner wall surface which corresponds to said outer wall surface of the valve body so as to permit the valve sleeve member to encompass the outer wall surface of the valve body with the inner wall surface of the valve sleeve member being in slidable engagement with the outer wall surface of the valve body between a closed position and an open position with the relative motion therebetween being at least generally parallel to the longitudinal axis of the valve body so that in said closed position said at least one fluid pressure relief opening is at least substantially sealed by the valve sleeve member and in said open position said at least one fluid pressure relief opening is not blocked by the valve sleeve member, a second chamber located with said valve sleeve member and being at least generally defined by the second end of the valve body, said cap wall and said inner wall surface of the valve sleeve member;

a pressure actuatable element positioned to block said opening in the second end of the valve body when the fluid pressure in said first chamber in the valve body is below said predetermined value and to unblock said opening in the second end of the valve body when the fluid pressure in said first chamber in the valve body is above said predetermined value, thereby permitting fluid to pass from the pressurized fluid container through said first chamber and the opening in the second end of the valve body into said second chamber when the fluid pressure in the pressurized fluid container exceeds said predetermined value, with the resulting increase in pressure against the cap wall of the valve sleeve member causing the movement of the valve sleeve member from said closed position to said open position to thereby vent fluid from the pressurized fluid container through said first chamber and said at least one fluid pressure relief opening in the outer wall surface of the valve body; and a bleed opening in said valve sleeve member in fluid communication with said second chamber to permit fluid pressure in said second chamber to decrease by fluid bleeding through the bleed opening after the pressure in the pressurized fluid container has dropped to a value which permits the pressure actuatable element to again block said opening in the second end of the valve body.

12. A relief valve in accordance with claim 11 wherein said pressure actuatable element comprises a closure member of a size sufficient to block said opening in the second end of the valve body, and a spring biasing said closure member into engagement with the second end of the valve body to block said opening in the second end of the valve body.

13. A relief valve in accordance with claim 10 wherein said opening in the second end of the valve body is a circular opening and said closure member is a disc with the diameter of said disc being greater than the diameter of said circular opening, and further comprising a bracket attached to said second end of said valve body and surmounting said disc with said spring being positioned between said disc and said bracket.

14. A relief valve in accordance with claim 10 wherein each of said outer wall surface of the valve body and said inner wall surface of the valve sleeve member is at least generally defined by the revolution of a line about the longitudinal axis of the valve body.

15. A relief valve in accordance with claim 10 wherein each of said outer wall surface of the valve body and said inner wall surface of the valve sleeve member has at least generally the configuration of a surface defined by the revolution about the longitudinal axis of the valve body of a line parallel to said longitudinal axis.

16. A relief valve in accordance with claim 15 further comprising a bleed opening in said valve sleeve member in fluid communication with said second chamber to permit fluid pressure in said second chamber to decrease by fluid bleeding through the bleed opening after the pressure in the pressurized fluid container has dropped to a value which permits the closure member to again block said opening in the second end of the valve body.

17. A relief valve in accordance with claim 10 wherein the ratio of (a) the area of the inside surface of the valve sleeve member which is effectively perpendicular to the longitudinal axis of the valve body and is exposed to fluid pressure in said second chamber to (b) the area of said opening in the second end of the valve body, and the ratio of the weight of said valve sleeve member to the effective weight of the resistance of said closure member and said spring are such that the pressure in said first chamber required to move said closure member to unblock said opening in the second end of the valve body is substantially more than the fluid pressure in said second chamber required to move said valve sleeve member from said closed position to said open position.

18. A relief valve in accordance with claim 17 further comprising annular sealing means positioned in one of said valve body and said valve sleeve element to prevent fluid communication between said first chamber and said second chamber via the annular space between said outer wall surface of the valve body and said inner wall surface of the valve sleeve member.

19. A relief valve in accordance with claim 11 further comprising a bleed valve operatively connected to said bleed opening.

20. A relief valve in accordance with claim 11 wherein the ratio of (a) the area of the inside surface of the valve sleeve member which is effectively perpendicular to the longitudinal axis of the valve body and is exposed to fluid pressure in said second chamber to (b) the area of said opening in the second end of the valve body, and the ratio of the weight of said valve sleeve member to the effective weight of the resistance of said pressure actuatable element are such that the pressure in said first chamber required to move said pressure actuatable element to unblock said opening in the second end of the valve body is substantially more than the fluid pressure in said second chamber required to move said valve sleeve member from said closed position to said open position.

21. A relief valve in accordance with claim 11 further comprising annular sealing means positioned in one of said valve body and said valve sleeve element to prevent fluid communication between said first chamber and said second chamber via the annular space between said outer wall surface of the valve body and said inner wall surface of the valve sleeve member.

* * * * *

UNITED STATES PATENT AND TRADEMARK OFFICE
CERTIFICATE OF CORRECTION

PATENT NO. : 4,958,656

DATED : September 25, 1990

INVENTOR(S) : Ajitkumar G. Patel

It is certified that error appears in the above-identified patent and that said Letters Patent is hereby corrected as shown below:

```
Column 5, line 37, change "val;ve" to --valve--.
Column 8, line 67, change "with" to --within--.
```

Signed and Sealed this

Tenth Day of November, 1992

*Attest:*

DOUGLAS B. COMER

*Attesting Officer*      *Acting Commissioner of Patents and Trademarks*